(12) United States Patent
Jing et al.

(10) Patent No.: US 12,460,575 B2
(45) Date of Patent: Nov. 4, 2025

(54) AIR ENERGY STORAGE SYSTEM AND METHOD FOR DEEP LEVEL CASCADE UTILIZATION OF ENERGY

(71) Applicants: Xi'an Thermal Power Research Institute Co., Ltd, Xi'an (CN); Northwestern Polytechnical University, Xi'an (CN)

(72) Inventors: Xiaolei Jing, Xi'an (CN); Cunliang Liu, Xi'an (CN); Yuwen Lin, Xi'an (CN); Dangqi Xu, Xi'an (CN); Liang Zhao, Xi'an (CN); Shuting Liang, Xi'an (CN)

(73) Assignees: Xi'an Thermal Power Research Institute Co., Ltd, Xi'an (CN); Northwestern Polytechnical University, Xi'an (CN)

( * ) Notice: Subject to any disclaimer, the term of this patent is extended or adjusted under 35 U.S.C. 154(b) by 100 days.

(21) Appl. No.: 18/440,416

(22) Filed: Feb. 13, 2024

(65) Prior Publication Data
US 2024/0271562 A1   Aug. 15, 2024

(30) Foreign Application Priority Data
Feb. 15, 2023   (CN) .......................... 202310117576.5

(51) Int. Cl.
F28D 20/00   (2006.01)
F02C 6/16   (2006.01)

(52) U.S. Cl.
CPC ............ F02C 6/16 (2013.01); F28D 20/0034 (2013.01); *F28D 2020/0047* (2013.01)

(58) Field of Classification Search
CPC ................... F02C 6/16; F28D 20/0034; F28D 2020/0047; Y02E 60/14; Y02E 60/16
See application file for complete search history.

(56) References Cited

FOREIGN PATENT DOCUMENTS

| | | | | |
|---|---|---|---|---|
| CN | 112943385 A | * | 6/2021 | ............ F01D 17/10 |
| CN | 114704456 A | * | 7/2022 | ............... F01K 7/02 |
| CN | 115506860 A | * | 12/2022 | .............. F01K 11/02 |
| CN | 115559870 A | * | 1/2023 | ............. F03G 6/068 |
| WO | WO-2023221243 A1 | * | 11/2023 | ............. F22B 33/18 |

* cited by examiner

*Primary Examiner* — Jonathan R Matthias
(74) *Attorney, Agent, or Firm* — Maginot, Moore & Beck, LLP

(57) ABSTRACT

An air energy storage system for deep level cascade utilization of energy includes a compressor unit, an air storage chamber, a molten salt heat exchanger and a water source heat exchanger. All stages of compressors in the compressor unit are connected in series, a compressed air outlet of the last stage of compressor is connected with an air inlet of the air storage chamber, a pipeline at a compressed air outlet of each stage of compressor in the compressor unit is sequentially provided with the molten salt heat exchanger and the water source heat exchanger along a flow direction of a compressed air, and a hot end of the molten salt heat exchanger and a hot end of the water source heat exchanger are connected to the pipeline at the compressed air outlet of the compressor.

10 Claims, 1 Drawing Sheet

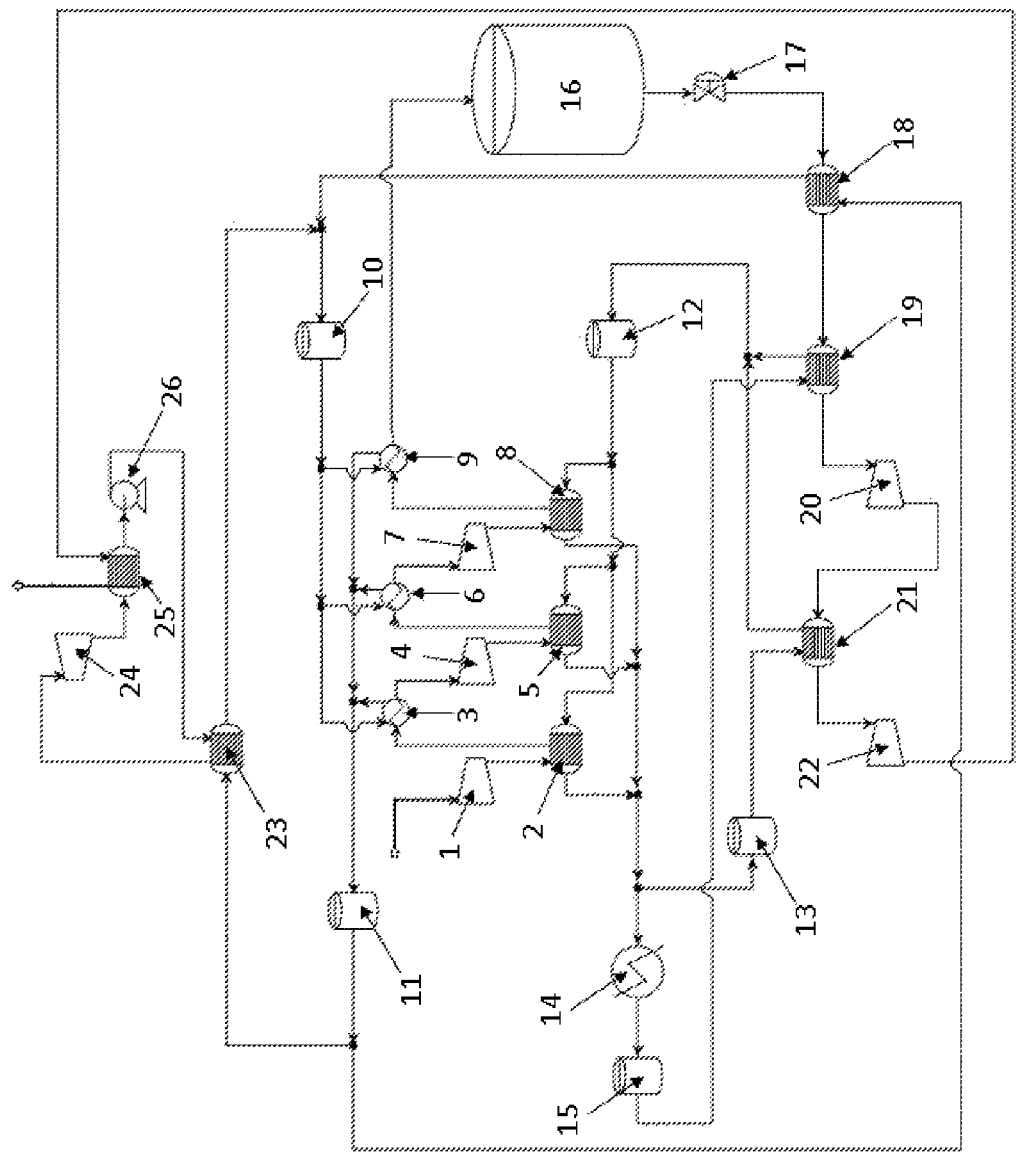

AIR ENERGY STORAGE SYSTEM AND METHOD FOR DEEP LEVEL CASCADE UTILIZATION OF ENERGY

CROSS-REFERENCE TO RELATED APPLICATION

This application is based on and claims priority to Chinese Patent Application No. 202310117576.5 filed on Feb. 15, 2023, the entire contents of which are incorporated herein by reference for all purposes.

FIELD

The present disclosure relates to a field of physical energy storage, and particularly relates to an air energy storage system and a method for deep level cascade utilization of energy.

BACKGROUND

With the large-scale utilization of new energy, energy storage has become an indispensable link in the process of global energy transformation. Especially in the scene of a large-scale new energy base, the support of a large-scale, long-term, efficient and low-cost energy storage technology is needed. Among many energy storage technologies, it is generally believed that the air compression energy storage system is obviously one of the most competitive large-scale electric energy storage technologies. However, at present, the development of the air compression energy storage technology is limited by two factors of the low efficiency of the electricity-electricity conversion and the high investment cost of the gas storage chamber volume. In order to achieve a breakthrough in this respect, the supplementary combustion air compression energy storage technology is adopted. On the one hand, it improves the energy storage density per unit air mass, and reduces the volume of the air storage chamber per unit kilowatt hour. On the other hand, it increases the air temperature at the turbine inlet, and the power generation efficiency, and further improves the electricity-electricity conversion efficiency.

At present, there are two technical methods for this technology. One is to use fossil fuel for supplementary combustion, which on the one hand produces carbon emissions and pollutant emissions, and on the other hand, of which the heat does not match with the inlet temperature of the turbine well, resulting in that the supplementary combustion heat cannot be effectively converted into the effective power generation of the turbine. The other is to use high temperature molten salt for supplementary combustion to increase the inlet temperature of the turbine. Although this method will not produce carbon emissions and pollutant emissions, the heat utilization and matching are unreasonable, resulting in a large waste of the rest supplementary combustion heat and a low system efficiency, so that it cannot play a role in improving the efficiency of the air compression energy storage system, and it is difficult to popularize and apply this method on a large scale in the later stage. In the above two technical methods, there is an unreasonable matching between the supplementary combustion heat of the system and the system, which leads to the failure to fully realize the thermoelectric conversion of heat, the failure to maximize the efficiency of the electricity-electricity conversion, and the failure to minimize the cost of the gas storage chamber volume.

SUMMARY

An air energy storage system for deep level cascade utilization of energy according to embodiments of a first aspect of the present disclosure includes a compressor unit, a molten salt heat exchanger, a high temperature molten salt tank, an air storage chamber, a middle temperature molten salt tank, a middle temperature molten salt heater, a high temperature molten salt heater, a low temperature molten salt tank, a primary turbine, a secondary turbine, a primary low temperature water source heater, a low temperature water source tank, a water source heat exchanger, a high temperature water source tank, a secondary low temperature water source heater, an expander, a condenser and a circulating pump. All stages of compressors in the compressor unit are connected in series, a compressed air outlet of the last stage of compressor is connected with an air inlet of the air storage chamber, a pipeline at the compressed air outlet of each stage of compressor in the compressor unit is sequentially provided with the molten salt heat exchanger and the water source heat exchanger along a flow direction of the compressed air, and a hot end of the molten salt heat exchanger and a hot end of the water source heat exchanger are connected to the pipeline at the compressed air outlet of the compressor; a cold inlet of the molten salt heat exchanger is connected with an outlet of the low temperature molten salt tank, a cold outlet of the molten salt heat exchanger is divided into two paths and connected with an inlet of the molten salt heater and an inlet of the middle temperature molten salt tank respectively, and an outlet of the molten salt heater is connected with an inlet of the high temperature molten salt tank; an outlet of the high temperature molten salt tank is connected with a hot inlet of the high temperature molten salt heater, and a hot outlet of the high temperature molten salt heater is connected with a molten salt inlet of the low temperature molten salt tank; an outlet of the middle temperature molten salt tank is connected with a hot inlet of the middle temperature molten salt heater, and a hot outlet of the middle temperature molten salt heater is connected with a molten salt inlet of the low temperature molten salt tank; an air outlet of the air storage chamber is connected with a cold inlet of the primary low temperature water source heater, a cold outlet of the primary low temperature water source heater is connected with a cold inlet of the high temperature molten salt heater, a cold outlet of the high temperature molten salt heater is connected with an air inlet of the primary turbine, an air outlet of the primary turbine is connected with a cold inlet of the middle temperature molten salt heater, a cold outlet of the middle temperature molten salt heater is connected with an air inlet of the secondary turbine, an air outlet of the secondary turbine is connected with a cold inlet of the condenser, a circulating working medium outlet of the expander is connected with a hot inlet of the condenser, a hot outlet of the condenser is connected with an inlet of the circulating pump, an outlet of the circulating pump is connected with a cold inlet of the secondary low temperature water source heater, and a cold outlet of the secondary low temperature water source heater is connected with a circulating working medium inlet of the expander; and a cold inlet of the water source heat exchanger is connected with a water outlet of the low temperature water source tank, and a cold outlet of the water source heat exchanger is connected with a water inlet of the high temperature water source tank.

A method for deep level cascade utilization of energy according to embodiments of a second aspect of the present disclosure is carried out by the above air energy storage system for deep level cascade utilization of energy according the embodiments of the first aspect of the present disclosure, and includes an energy storage process and an energy release process. In the energy storage process, the compressor unit is started, and the molten salt heat exchanger and the water source heat exchanger on the pipeline at the compressed air outlet of each stage of compressor absorb heat of the compressed air of the stage and store energy, wherein a part of heated molten salt in the molten salt heat exchanger is stored in the middle temperature molten salt tank, another part of the heated molten salt in the molten salt heat exchanger is heated to a preset temperature by the molten salt heater and stored in the high temperature molten salt tank, heated water in the water source heat exchanger is stored in the high temperature water source tank, and the compressed air compressed by the compressor unit is stored in the air storage chamber. In the energy release process, the compressed air in the air storage chamber is sent into the primary low temperature water source heater, water in the high temperature water source tank enters the primary low temperature water source heater and preheats air in the primary low temperature water source heater, and the air preheated by the primary low temperature water source heater enters the high temperature molten salt heater; molten salt in the high temperature molten salt tank enters the high temperature molten salt heater and heats air in the high temperature molten salt heater, the air heated by the high temperature molten salt heater enters the primary turbine to do work, and the air discharged from the air outlet of the primary turbine enters the middle temperature molten salt heater; and molten salt in the middle temperature molten salt tank enters the middle temperature molten salt heater and heats air in the middle temperature molten salt heater, the air heated by the middle temperature molten salt heater enters the secondary turbine to do work, air discharged from the air outlet of the secondary turbine enters the condenser and cools a circulating working medium discharged by the expander, the circulating working medium cooled by the condenser is pumped into the secondary low temperature water source heater through the circulating pump, the secondary low temperature water source heater heats the circulating working medium entering the secondary low temperature water source heater by using the high temperature water source tank, and the circulating working medium heated by the secondary low temperature water source heater enters the expander to do work.

BRIEF DESCRIPTION OF THE DRAWINGS

FIG. 1 is a schematic diagram of an air energy storage system for deep level cascade utilization of energy according to the present disclosure.

DETAILED DESCRIPTION

The present disclosure will be further described with reference to the attached drawings.

Referring to FIG. 1, an air energy storage system for deep level cascade utilization of energy according to the present disclosure includes a compressor unit, a molten salt heat exchanger, a high temperature molten salt tank 15, an air storage chamber 16, a middle temperature molten salt tank 13, a middle temperature molten salt heater 21, a high temperature molten salt heater 19, a low temperature molten salt tank 12, a primary turbine 20, a secondary turbine 22, a primary low temperature water source heater 18, a low temperature water source tank 10, a water source heat exchanger, a high temperature water source tank 11, a secondary low temperature water source heater 23, an expander 24, a condenser 25 and a circulating pump 26. All stages of compressors in the compressor unit are connected in series, an air inlet of the primary compressor is communicated with the atmosphere, a compressed air outlet of the last stage of compressor is connected with an air inlet of the air storage chamber 16, a pipeline at the compressed air outlet of each stage of compressor in the compressor unit is sequentially provided with the molten salt heat exchanger and the water source heat exchanger along a flow direction of the compressed air, and a hot end of the molten salt heat exchanger and a hot end of the water source heat exchanger are connected to the pipeline at the compressed air outlet of the compressor. A cold inlet of the molten salt heat exchanger is connected with an outlet of the low temperature molten salt tank 12, a cold outlet of the molten salt heat exchanger is divided into two paths and connected with an inlet of the molten salt heater 14 and an inlet of the middle temperature molten salt tank 13 respectively, and an outlet of the molten salt heater 14 is connected with an inlet of the high temperature molten salt tank 15. An outlet of the high temperature molten salt tank 15 is connected with a hot inlet of the high temperature molten salt heater 19, and a hot outlet of the high temperature molten salt heater 19 is connected with a molten salt inlet of the low temperature molten salt tank 12. An outlet of the middle temperature molten salt tank 13 is connected with a hot inlet of the middle temperature molten salt heater 21, and a hot outlet of the middle temperature molten salt heater 21 is connected with a molten salt inlet of the low temperature molten salt tank 12. An air outlet of the air storage chamber 16 is connected with a cold inlet of the primary low temperature water source heater 18, a cold outlet of the primary low temperature water source heater 18 is connected with a cold inlet of the high temperature molten salt heater 19, a cold outlet of the high temperature molten salt heater 19 is connected with an air inlet of the primary turbine 20, an air outlet of the primary turbine 20 is connected with a cold inlet of the middle temperature molten salt heater 21, a cold outlet of the middle temperature molten salt heater 21 is connected with an air inlet of the secondary turbine 22, an air outlet of the secondary turbine 22 is connected with a cold inlet of the condenser 25, a cold outlet of the condenser 25 communicates with the atmosphere, a circulating working medium outlet of the expander 24 is connected with a hot inlet of the condenser 25, a hot outlet of the condenser 25 is connected with an inlet of the circulating pump 26, an outlet of the circulating pump 26 is connected with a cold inlet of the secondary low temperature water source heater 23, and a cold outlet of the secondary low temperature water source heater 23 is connected with a circulating working medium inlet of the expander 24. A cold inlet of the water source heat exchanger is connected with a water outlet of the low temperature water source tank 10, and a cold outlet of the water source heat exchanger is connected with a water inlet of the high temperature water source tank 11.

The method for deep level cascade utilization of energy based on the air energy storage system for deep level cascade utilization of energy of the present disclosure includes an energy storage process and an energy release process.

In the energy storage process, the compressor unit is started, the air is compressed stage by stage through the compressor unit, where the temperature of the compressed air at the compressed air outlet of each stage of compressor is 250-270° C., the molten salt heat exchanger and the water source heat exchanger on the pipeline at the compressed air outlet of each stage of compressor absorb heat of the compressed air of this stage and store energy, and after heat exchange by the molten salt heat exchanger, the temperature of the molten salt rises to 300-350° C., and the temperature of the compressed air is reduced to 160~170° C. A part of the heated molten salt in the molten salt heat exchanger is stored in the middle temperature molten salt tank 13, another part of the heated molten salt in the molten salt heat exchanger is heated to 530~540° C. by the molten salt heater 14 and stored in the high temperature molten salt tank 15. The water in the water source heat exchanger is heated to 150~160° C. and stored in the high temperature water source tank 11, and the temperature of the compressed air is further reduced to 35-40° C. after heat exchange by the water source heat exchanger. The compressed air compressed by the compressor unit is stored in the air storage chamber 16, and the temperature of the compressed air in the air storage chamber 16 is 35-40° C. with a pressure of 9-10 MPa.

In the energy release process, the compressed air in the air storage chamber 16 is sent to the primary low temperature water source heater 18, the water in the high temperature water source tank 11 enters the primary low temperature water source heater 18, and preheats the air in the primary low temperature water source heater 18 to 150-160° C., and the air preheated by the primary low temperature water source heater 18 enters the high temperature molten salt heater 19.

The molten salt in the high temperature molten salt tank 15 enters the high temperature molten salt heater 19 and heats the air in the high temperature molten salt heater 19 to 530~535° C., and the air heated by the high temperature molten salt heater 19 enters the primary turbine 20 to do work. The exhaust temperature of the primary turbine 20 is 200~220° C., and the air discharged from the air outlet of the primary turbine 20 enters the middle temperature molten salt heater 21.

The molten salt in the middle temperature molten salt tank 13 enters the middle temperature molten salt heater 21 and heats the air in the middle temperature molten salt heater 21 to 350-360° C., and the air heated by the middle temperature molten salt heater 21 enters the secondary turbine 22 to do work. The exhaust temperature of the secondary turbine 22 is 20-25° C., and the air discharged from the air outlet of the secondary turbine 22 enters the condenser 25 and cools the circulating working medium discharged by the expander 24 to 30-40° C. The circulating working medium cooled by the condenser 25 is pumped into the secondary low temperature water source heater 23 through the circulating pump 26, and the secondary low temperature water source heater 23 heats the circulating working medium entering the secondary low temperature water source heater 23 to 160-165° C. by using the high temperature water source tank 11. The circulating working medium heated by the secondary low temperature water source heater 23 enters the expander 24 to do work, thus realizing efficient power generation by organic Rankine cycle.

The present disclosure utilizes the quality characteristics of compression heat of the compressor unit and the parameter characteristics of the high temperature molten salt, the middle temperature molten salt and the low temperature molten salt, and proposes the mode of coupling the molten salt with the water to carry out the compression heat storage and the system recycling, that is, the molten salt heat exchanger and the water source heat exchanger are sequentially arranged on the pipeline at the compressed air outlet of each stage of compressor in the compressor unit along the flow direction of the compressed air. In the energy storage process, the high temperature compression heat is stored in the molten salt, and the low temperature compression heat is stored in the water, so that the problem related to the efficient storage of the compression heat is solved, and the compression efficiency in the compression stage is further improved, thus improving the energy storage efficiency of the whole system. The high-grade heat in the high temperature molten salt tank and the medium-grade heat in the middle temperature molten salt tank can respectively raise the inlet temperatures of the primary turbine and the secondary turbine, thereby improving the power generation efficiencies of the primary turbine and the secondary turbine. The low-grade heat is stored in the high temperature water source tank. On the one hand, the water in the high temperature water source tank can be used to preheat the air temperature at the cold end of the high temperature molten salt heater. On the other hand, it can be coupled with the organic Rankine cycle to generate electricity, and the circulating working medium at the inlet of the expander is heated by the secondary low temperature water source heater, so that the present disclosure can make full use of the low-grade heat and realize the efficient power generation. According to the present disclosure, the electricity-electricity conversion efficiency can be effectively improved through the cascade utilization of the high-grade, medium-grade and low-grade heat during the air compression. Through simulation calculation, the electricity-electricity conversion efficiency of the present disclosure reaches 68%, which is 5%-7% higher than that of the 60 MW Jintan air compression energy storage demonstration project put into operation in 2022 (the electricity-electricity conversion efficiency of this project is 61%-63%). Considering the increase of the air energy storage density per unit amount of substance, the present disclosure can reduce the construction scale of the compressed air storage chamber by 15%~20%. In addition, the present disclosure uses the air compression energy storage coupled with the molten salt to supplement heat, which can greatly improve the regulation characteristics and effect rate of the whole system.

In some embodiments, the compressor unit includes a primary compressor 1, a secondary compressor 4 and a tertiary compressor 7 sequentially connected in series, the molten salt heat exchanger includes a primary molten salt heat exchanger 2, a secondary molten salt heat exchanger 5 and a tertiary molten salt heat exchanger 8, and the water source heat exchanger includes a primary water source heat exchanger 3, a secondary water source heat exchanger 6 and a tertiary water source heat exchanger 9. A hot end of the primary molten salt heat exchanger 2 and a hot end of the primary water source heat exchanger 3 are connected to a pipeline at a compressed air outlet of the primary compressor 1, a hot end of the secondary molten salt heat exchanger 5 and a hot end of the secondary water source heat exchanger 6 are connected to a pipeline at a compressed air outlet of the secondary compressor 4, and a hot end of the tertiary molten salt heat exchanger 8 and a hot end of the tertiary water source heat exchanger 9 are connected to a pipeline at a compressed air outlet of the tertiary compressor 7. Pipelines at cold outlets of the primary molten salt heat exchanger 2, the secondary molten salt heat exchanger 5 and the tertiary molten salt heat exchanger 8 are merged into one path and then divided into two paths, and the two paths are connected with the inlet of the molten salt heater 14 and the inlet of the middle temperature molten salt tank 13, respectively.

In the embodiments, the parameters of each device are as follows. The total generation power of the primary turbine 20 and the secondary turbine 22 is 100.45 MW, the generation power of the organic Rankine cycle is 15.24 MW, the total electric power consumed by the primary compressor 1, the secondary compressor 4 and the tertiary compressor 7 is 111.40 MW, and the electric heating power of the molten salt heater 14 is 58.72 MW. In the embodiments, the auxiliary power of the air energy storage system for deep level cascade utilization of energy accounts for 1% of the gross generation, with the electricity-electricity efficiency of 68.01%, the energy storage time is 10 h, and the air temperatures at the hot outlets of the primary water source heat exchanger 3, the secondary water source heat exchanger 6 and the tertiary water source heat exchanger 9 are all 40° C. The air input temperature of the primary compressor 1 is the ambient temperature, whose value is 25° C. The exhaust temperatures of the primary compressor 1, the secondary compressor 4 and the tertiary compressor 7 are all 250° C., the exhaust pressure of the primary compressor 1 is 5.8 bar, the exhaust pressure of the secondary compressor 4 is 28.5 bar, and the exhaust pressure of the tertiary compressor 7 is 140 bar. The temperature of the molten salt in the low temperature molten salt tank 12 is 160° C., the temperature of the molten salt in the middle temperature molten salt tank 13 is 245° C., and the temperature of the molten salt in the high temperature molten salt tank 15 is 540° C. The water temperature in the low temperature water source tank 10 is 25° C., and the water temperature in the high temperature water source tank 11 is 162° C. The temperature of the air preheated by the primary low temperature water heater 18 is 150° C., the air input pressure of the primary turbine 20 is 96 bar, the air input temperature of the primary turbine 20 is 530° C., and the exhaust temperature of the primary turbine 20 is 163° C. The air input temperature of the secondary turbine 22 is 240° C., and the exhaust temperature of the secondary turbine 22 is 21° C. The exhaust temperature of the expander 24 is 35° C., the temperature of the circulating working medium cooled by the condenser 25 is 30° C., and the required volume of the air storage chamber 16 is 144437.7 $m^3$. The current air compression energy storage project with an energy storage power of 100 MW/1000 MWh adopts the non-supplementary-combustion air storage chamber with a volume of about 230000-250000 $m^3$, or adopts the supplementary-combustion air compression energy storage technical method involving the air storage chamber with a volume of 160000-180000 $m^3$. Thus, it can be seen that the present disclosure can effectively reduce the construction scale and the investment cost of the air chamber.

The invention claimed is:

1. An air energy storage system for deep level cascade utilization of energy, comprising a compressor unit, a molten salt heat exchanger, a high temperature molten salt tank, an air storage chamber, a middle temperature molten salt tank, a middle temperature molten salt heater, a high temperature molten salt heater, a low temperature molten salt tank, a primary turbine, a secondary turbine, a primary low temperature water source heater, a low temperature water source tank, a water source heat exchanger, a high temperature water source tank, a secondary low temperature water source heater, an expander, a condenser and a circulating pump, wherein all stages of compressors in the compressor unit are connected in series, a compressed air outlet of the last stage of compressor is connected with an air inlet of the air storage chamber, a pipeline at a compressed air outlet of each stage of compressor in the compressor unit is sequentially provided with the molten salt heat exchanger and the water source heat exchanger along a flow direction of a compressed air, and a hot end of the molten salt heat exchanger and a hot end of the water source heat exchanger are connected to the pipeline at the compressed air outlet of the compressor;

a cold inlet of the molten salt heat exchanger is connected with an outlet of the low temperature molten salt tank, a cold outlet of the molten salt heat exchanger is divided into two paths and connected with an inlet of the molten salt heater and an inlet of the middle temperature molten salt tank respectively, and an outlet of the molten salt heater is connected with an inlet of the high temperature molten salt tank;

an outlet of the high temperature molten salt tank is connected with a hot inlet of the high temperature molten salt heater, and a hot outlet of the high temperature molten salt heater is connected with a molten salt inlet of the low temperature molten salt tank;

an outlet of the middle temperature molten salt tank is connected with a hot inlet of the middle temperature molten salt heater, and a hot outlet of the middle temperature molten salt heater is connected with a molten salt inlet of the low temperature molten salt tank;

an air outlet of the air storage chamber is connected with a cold inlet of the primary low temperature water source heater, a cold outlet of the primary low temperature water source heater is connected with a cold inlet of the high temperature molten salt heater, a cold outlet of the high temperature molten salt heater is connected with an air inlet of the primary turbine, an air outlet of the primary turbine is connected with a cold inlet of the middle temperature molten salt heater, a cold outlet of the middle temperature molten salt heater is connected with an air inlet of the secondary turbine, an air outlet of the secondary turbine is connected with a cold inlet of the condenser, a circulating working medium outlet of the expander is connected with a hot inlet of the condenser, a hot outlet of the condenser is connected with an inlet of the circulating pump, an outlet of the circulating pump is connected with a cold inlet of the secondary low temperature water source heater, and a cold outlet of the secondary low temperature water source heater is connected with a circulating working medium inlet of the expander; and a cold inlet of the water source heat exchanger is connected with a water outlet of the low temperature water source tank, and a cold outlet of the water source heat exchanger is connected with a water inlet of the high temperature water source tank.

2. The air energy storage system for deep level cascade utilization of energy according to claim 1, wherein a cold outlet of the condenser is communicated with an atmosphere.

3. A method for deep level cascade utilization of energy, wherein the method is carried out by an air energy storage system for deep level cascade utilization of energy, and comprises an energy storage process and an energy release process, wherein the air energy storage system for deep level cascade utilization of energy comprises a compressor unit, a molten salt heat exchanger, a high temperature molten salt tank, an air storage chamber, a middle temperature molten salt tank, a middle temperature molten salt heater, a high temperature molten salt heater, a low temperature molten salt tank, a primary turbine, a secondary turbine, a primary low temperature water source heater, a low temperature water source tank, a water source heat exchanger, a high temperature water source tank, a secondary low temperature water source heater, an expander, a condenser and a circulating pump, wherein all stages of compressors in the compressor unit are connected in series, a compressed air outlet of the last stage of compressor is connected with an air inlet of the air storage chamber, a pipeline at a compressed air outlet of each stage of compressor in the compressor unit is sequentially provided with the molten salt heat exchanger and the water source heat exchanger along a flow direction of a compressed air, and a hot end of the molten salt heat exchanger and a hot end of the water source heat exchanger are connected to the pipeline at the compressed air outlet of the compressor;

a cold inlet of the molten salt heat exchanger is connected with an outlet of the low temperature molten salt tank, a cold outlet of the molten salt heat exchanger is divided into two paths and connected with an inlet of the molten salt heater and an inlet of the middle temperature molten salt tank respectively, and an outlet of the molten salt heater is connected with an inlet of the high temperature molten salt tank;

an outlet of the high temperature molten salt tank is connected with a hot inlet of the high temperature molten salt heater, and a hot outlet of the high temperature molten salt heater is connected with a molten salt inlet of the low temperature molten salt tank;

an outlet of the middle temperature molten salt tank is connected with a hot inlet of the middle temperature molten salt heater, and a hot outlet of the middle temperature molten salt heater is connected with a molten salt inlet of the low temperature molten salt tank;

an air outlet of the air storage chamber is connected with a cold inlet of the primary low temperature water source heater, a cold outlet of the primary low temperature water source heater is connected with a cold inlet of the high temperature molten salt heater, a cold outlet of the high temperature molten salt heater is connected with an air inlet of the primary turbine, an air outlet of the primary turbine is connected with a cold inlet of the middle temperature molten salt heater, a cold outlet of the middle temperature molten salt heater is connected with an air inlet of the secondary turbine, an air outlet of the secondary turbine is connected with a cold inlet of the condenser, a circulating working medium outlet of the expander is connected with a hot inlet of the condenser, a hot outlet of the condenser is connected with an inlet of the circulating pump, an outlet of the circulating pump is connected with a cold inlet of the secondary low temperature water source heater, and a cold outlet of the secondary low temperature water source heater is connected with a circulating working medium inlet of the expander; and a cold inlet of the water source heat exchanger is connected with a water outlet of the low temperature water source tank, and a cold outlet of the water source heat exchanger is connected with a water inlet of the high temperature water source tank, wherein in the energy storage process, the compressor unit is started, and the molten salt heat exchanger and the water source heat exchanger on the pipeline at the compressed air outlet of each stage of compressor absorb heat of the compressed air of the stage and store energy, wherein a part of heated molten salt in the molten salt heat exchanger is stored in the middle temperature molten salt tank, another part of the heated molten salt in the molten salt heat exchanger is heated to a preset temperature by the molten salt heater and stored in the high temperature molten salt tank, heated water in the water source heat exchanger is stored in the high temperature water source tank, and the compressed air compressed by the compressor unit is stored in the air storage chamber; and wherein in the energy release process, the compressed air in the air storage chamber is sent into the primary low temperature water source heater, water in the high temperature water source tank enters the primary low temperature water source heater and preheats air in the primary low temperature water source heater, and the air preheated by the primary low temperature water source heater enters the high temperature molten salt heater;

molten salt in the high temperature molten salt tank enters the high temperature molten salt heater and heats air in the high temperature molten salt heater, the air heated by the high temperature molten salt heater enters the primary turbine to do work, and air discharged from the air outlet of the primary turbine enters the middle temperature molten salt heater; and molten salt in the middle temperature molten salt tank enters the middle temperature molten salt heater and heats air in the middle temperature molten salt heater, the air heated by the middle temperature molten salt heater enters the secondary turbine to do work, air discharged from the air outlet of the secondary turbine enters the condenser and cools a circulating working medium discharged by the expander, the circulating working medium cooled by the condenser is pumped into the secondary low temperature water source heater through the circulating pump, the secondary low temperature water source heater heats the circulating working medium entering the secondary low temperature water source heater by using the high temperature water source tank, and the circulating working medium heated by the secondary low temperature water source heater enters the expander to do work.

4. The method for deep level cascade utilization of energy according to claim 3, wherein a temperature of the compressed air at the compressed air outlet of each stage of compressor is 250-270° C., and after heat exchange by the molten salt heat exchanger, the temperature of the molten salt is 300-350° C., and the temperature of the compressed air is 160-170° C.

5. The method for deep level cascade utilization of energy according to claim 4, wherein after being heated by the molten salt heater, the temperature of the molten salt is 530-540° C.

6. The method for deep level cascade utilization of energy according to claim 4, wherein after heat exchange by the water source heat exchanger, the water is heated to 150-160° C., and the temperature of the compressed air is 35-40° C.

7. The method for deep level cascade utilization of energy according to claim 4, wherein the compressed air in the air storage chamber has a temperature of 35-40° C. and a pressure of 9-10 MPa.

8. The method for deep level cascade utilization of energy according to claim 4, wherein the temperature of the air preheated by the primary low temperature water source heater is 150-160° C., the temperature of the air heated by the high temperature molten salt heater is 530-535° C., and an exhaust temperature of the primary turbine is 200-220° C.

9. The method for deep level cascade utilization of energy according to claim 8, wherein the temperature of the air heated by the middle temperature molten salt heater is 350-360° C., and an exhaust temperature of the secondary turbine is 20-25° C.

10. The method for deep level cascade utilization of energy according to claim 9, wherein the temperature of the circulating working medium cooled by the condenser is 30-40° C., and the temperature of the circulating working medium heated by the secondary low temperature water source heater is 160-165° C.

* * * * *